United States Patent [19]

Tucker et al.

[11] Patent Number: 5,476,552

[45] Date of Patent: Dec. 19, 1995

[54] SURFACE PREPARATION FOR BONDING TITANIUM

[75] Inventors: Wayne C. Tucker, Exeter; James C. Butts, Charlestown, both of R.I.; Leonard E. Burgmyer, Jr., Somerset; Raymond A. St. Amand, Fairhaven, both of Mass.

[73] Assignee: The United States of America as represented by the Secretary of the Navy, Washington, D.C.

[21] Appl. No.: 382,304

[22] Filed: Jan. 25, 1995

[51] Int. Cl.⁶ .................................................. C23C 22/33
[52] U.S. Cl. ................................. 148/248; 148/250
[58] Field of Search ........................... 148/248, 258

[56]  References Cited

U.S. PATENT DOCUMENTS

| | | | |
|---|---|---|---|
| 2,798,014 | 7/1957 | Bruxelles | 148/248 |
| 2,839,438 | 6/1958 | Rosenbloom | 148/248 |
| 3,994,751 | 11/1976 | Ingram | 148/248 |
| 4,111,884 | 9/1978 | Takase | 524/405 |

*Primary Examiner*—Sam Silverberg
*Attorney, Agent, or Firm*—Michael J. McGowan; Prithvi C. Lall; Michael F. Oglo

[57]  ABSTRACT

The present invention relates to a method for preparing a titanium or titanium alloy surface and a primer for use in the method. The method broadly comprises the steps of grit blasting portions of the surface to which an adhesive will be applied and thereafter applying an acid wash primer to the surface portions. The acid wash primer preferably consists essentially of 70% by weight isopropyl alcohol, 5% by weight ethyl alcohol, 15% by weight n-butyl alcohol, 5% by weight zinc chromate and 5% by weight phosphoric acid.

14 Claims, No Drawings

SURFACE PREPARATION FOR BONDING TITANIUM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a method for preparing surfaces of titanium and titanium alloys and a novel solution used therein.

2. Description of Prior Art

A wide range of techniques have been used to prepare surfaces of titanium and titanium alloys for bonding and other purposes. These techniques are exemplified by the following patents.

U.S. Pat. Nos. 2,881,106 and 2,945,779, both to Lipinski, illustrate methods of improving the bondability of titanium surfaces toward organic polymeric materials. The '106 patent describes a method which comprises wetting the titanium surface with an acid solution of sulfamic acid containing fluoride ions and having a pH below 3 until the titanium surface is visibly altered through etching and a film is formed which is discernible to the naked eye. The '779 patent describes a similar method wherein the titanium solution is wetted by a solution of nitrosulfonic acid and fluoride ions having a pH below 4.

U.S. Pat. No. 3,676,223 to Vazirani describes a method for the surface treatment of titanium and its alloys which results in improved joints between the titanium metal and organic materials. The method comprises treating the titanium material in an aqueous solution containing hydrofluoric acid, at least 60 percent by volume of concentrated phosphoric acid, and nitric or chromic acid. The treatment is effective to remove corrosion products from the surface and replace them with a mechanically strong protective layer. Vazirani points out that it is essential in his invention that the solution contain at least 60 percent by volume of concentrated phosphoric acid. Vazirani believes that the presence of phosphoric acid controls the rate of attack of the metal surface, thus permitting the formation of a mechanically strong oxide layer thereon.

U.S. Pat. No. 3,687,741 to Kendall illustrates a method for treating titanium or other Group IV transitional subgroup metals and their alloys in preparation for electroplating, anodizing, painting, adhesive bonding, and other surface processing. The method comprises immersing said metals in a hot aqueous solution containing a hydroxide of an alkali metal, a chelating agent, and at least one of the three trihydroxybenzenes or one of the methyl substituted alpha or beta naphthols. Sodium hydroxide is the preferred alkali metal hydroxide, while sodium gluconate is the preferred chelating agent. The trihydroxybenzene component may be 1,2,3 trihydroxybenzene, 1,3,5 trihydroxybenzene or the asymmetric form of the molecule 1,2,4 trihydroxybenzene.

U.S. Pat. No. 3,994,751 to Ingram relates to a solvent, organic acid and controlled water content mixture for wiping titanium and stainless steel surfaces just prior to painting. The mixture contains 0.5 to 1.0 vol % xylene, 0.5 to 1.0 vol. % glacial acetic acid, 0.5 to 1.0 vol % alcohol selected from 2-propanol, n-propanol, methanol or ethanol, 0.02 to 0.10 vol. % of water, 0.005 to 0.01 wt % of methyl orange, and the balance of the volume to reach 100% of a paint thinner selected from methyl ethyl ketone, toluene, methyl isobutyl ketone, ethyl acetate and lacquer-type solvents.

U.S. Pat. No. 4,075,040 to Villain relates to a titanium and titanium alloy surface preparation method in which the surface to be treated is subjected to a preliminary degreasing and scouring operation and then immersed in a bath containing fluorides in an acid medium, after which the surface is rinsed in demineralized water at a temperature of at least 50° C.

U.S. Pat. No. 4,394,224 to Mahoon et al. illustrates a method of treating articles of titanium or titanium alloy to form an adhesive receptive oxide layer. The method includes the steps of applying to the surface to be treated a mixture of aqueous solutions of sodium hydroxide and hydrogen peroxide, maintaining the applied mixture within a temperature range in which the hydrogen peroxide is relatively stable and causing an increased rate of oxidation at the surface regions.

U.S. Pat. No. 5,074,972 to Matz illustrates a method which utilizes an alkali bath for surface treatment of titanium or titanium alloy parts. The bath comprises an alkali hydroxide such as sodium hydroxide, a titanium complex forming component such as hydroxy carboxylic acid with less than six carbon atoms or a salt thereof, and an impurity ion-complex forming component such as ethylene diamine tetra-acetic acid. The bath can be alternatively applied by a simple dipping procedure or as a part of an anodizing process.

Some surface treatments for titanium and titanium alloy parts have involved the application of a grit. U.S. Pat. No. 3,891,456 to Hohman illustrates a process for treating a titanium or titanium alloy surface to improve its bonding characteristics. The process comprises directing a stream of a slurry of aluminum oxide grit in a hydrofluosilicic acid solution onto the surface for a period of time sufficient to obtain a uniform, oxide-free surface, washing the treated surface to remove grit and to terminate acid reaction, and drying the treated surface.

In actuality, grit blasting is the most common method for surface preparation of titanium. However, bond durability is poor for grit blasted adherands. Durable surface preparation can be achieved by forming oxides in anodizing and/or etching solutions. Typically anodization results in the best bond durability for titanium alloys, primarily because of the microrough surface morphology that results from the treatment. A typical acid etching preparation which is used is as follows: (a) cleaning bonding surfaces with trichloroethane; (b) etching the bonding surfaces for two minutes in 19.5–20.5 parts by volume 38% HCl, 1.5 to 2.5 parts by volume 85% $H_3PO_4$, and 0.9 to 1.1 parts by volume 48% HF; and (c) rinse in deionized water. A typical anodizing procedure is as follows: (a) degrease with methyl ethyl ketone; (b) pickle in a first solution having 15% by volume $HNO_3$ for 10 minutes and in a second solution having 49% HF for 30 seconds; (c) rinse in deionized water for 1 to 5 minutes; (d) anodize 50 g/l $CrO_3$, 1 g/l $NH_4HF_2$ at 10 volts for 24 minutes at 20° C.; (e) rinse in deionized water for 5 to 20 minutes; and air dry at a temperature in the range of from 25° C. to 60° C.

There are three distinct disadvantages to the acid etch and anodizing procedures. They are: (1) that they require extremely hazardous materials; (b) that they are difficult to apply to parts which cannot be immersed in a bath due to large surface area or curved surfaces; and (3) that they represent a threat to adjacent component parts of other materials.

The foregoing disadvantages are avoided by the method of the present invention.

SUMMARY OF THE INVENTION

Accordingly, it is a principal object of the present invention to provide a method for increasing the bondability of titanium or titanium alloy surfaces.

It is a further object of the present invention to provide a method as above which avoids acid etching.

It is still a further object of the present invention to provide a method as above which does not require the use of hazardous materials.

Still another object of the present invention is to provide a method as above which is not affected by part shape or size.

Yet another object of the present invention is to provide a method as above which is not a threat to adjacent component parts of materials.

The foregoing objects are attained by the present invention relating to a method for surface preparing titanium or titanium alloy parts to improve their bondability. The method of the present invention broadly comprises the steps of masking off surfaces not to be prepared, degreasing and grit blasting desired portions of said surface and thereafter applying a light coat of an acid primer comprising a mixture of alcohol, zinc chromate and phosphoric acid to the desired portions of said surface. In a preferred embodiment, the primer consists essentially of 90% by weight alcohol solution, 5% by weight zinc chromate and 5% by weight phosphoric acid, where the alcohol solution consists of about 65% to 80% by weight isopropyl alcohol, about 5% to 10% by weight ethyl alcohol and about 15% to 25% by weight n-butyl alcohol. After the primer has been allowed to dry, an adhesive is applied to the desired portions of said surface.

Other details of the method of the present invention, as well as other objects and advantages thereof, are set out in the following description.

DESCRIPTION OF THE PREFERRED EMBODIMENT

As previously discussed, the method of the present invention relates to preparing surfaces of titanium and titanium alloy parts for bonding to other structures. The method is applicable to titanium, either in pure or commercially pure form or in the form of alloys in which titanium is the major constituent.

The method of the present invention is as follows. In a first step, all portions or areas of the titanium or titanium alloy surface to which adhesive will not be applied are masked. Any suitable maskant known in the art may be used to mask these portions. Thereafter, the portions of the surface to be treated are degreased. This degreasing step is preferably performed by wiping isopropyl alcohol on the portions to be treated. To avoid rubbing contaminants into the surface being prepared, wiping is preferably carried out using a fresh wipe for each pass.

Following degreasing, the portions of the surface to be treated are grit blasted. Preferably a one pass grit blasting is carried out using 60 to 80 grit garnet or aluminum oxide. Grit blasting is preferably done with a vacuum blaster which recycles grit and keeps the surrounding area free of residue. During the grit blasting step the blasted area is vacuumed and blown out to remove unwanted debris and contaminants. The grit may be changed periodically to avoid inadequate surface roughness and possible contamination.

After grit blasting and removal of unwanted debris and contaminants have been completed, the surface is cleaned using isopropyl alcohol or another suitable cleaning solution and wiped cleaned, preferably using a low lint cleaning cloth. If needed, an inert gas may be used to remove any stray lint particles.

Following the cleaning step, a light coat of primer is applied to those portions of the titanium or titanium alloy surface being prepared for bonding and the primer is allowed to dry for a time. The primer is an acid wash primer consisting essentially of 90% by weight alcohol solution, 5% by weight zinc chromate and 5% by weight phosphoric acid. The alcohol solution consists of about 65% to 80% by weight isopropyl alcohol, about 5% to 10% by weight ethyl alcohol, and about 15% to 25% by weight n-butyl alcohol. An example of a suitable primer is 70% by weight isopropyl alcohol, 5% by weight ethyl alcohol, 15% by weight n-butyl alcohol, 5% by weight zinc chromate and 5% by weight phosphoric acid. The primer is preferably applied within 20 minutes of cleaning. It may be applied at room temperature using a spray gun. Preferably, the time period that the primer is allowed to dry is in the range of at least about 60 minutes. The adhesive to be applied to the treated portions of the titanium or titanium alloy surface should be applied as soon as possible after the drying period and within 24 hours of the primer application. Suitable adhesives which may be applied to the treated areas include epoxy adhesives.

Using the foregoing method, samples of titanium materials with an epoxy adhesive were made and tested in lap shear by ASTM D1002. The durability of the bond was tested by subjecting the samples to: (a) 30 day immersion in seawater; and (b) three days at 105° F. and 100% relative humidity.

Dry shear strengths for a general purpose, silica thixotrope epoxy adhesive were tested and compared with the samples subjected to seawater and high humidity. The strength and durability of the adhesive using the surface preparation method of the present invention met or exceeded samples which were prepared by an acid etch surface preparation.

One of the main advantages to the method of the present invention is that bonding may be achieved in almost any configuration or in situ without the need for etching baths. Also, there is no etching solution which needs to be disposed of as hazardous waste. The method also allows the achievement of a Class II durable bond to the titanium or titanium alloy.

It is apparent that there has been provided in accordance with this invention a surface preparation for bonding titanium which fully satisfies the objects, means, and advantages set forth hereinbefore. While the invention has been described in combination with specific embodiments thereof, it is evident that many alternatives, modifications, and variations will be apparent to those skilled in the art in light of the foregoing description. For example, titanium belongs to a group of metals in the Group IV transitional sub-group of the Periodic Table. These metals include zirconium, hafnium and thorium. Applicability of the surface preparation of the present invention to these metals is expected. Accordingly, it is intended to embrace all such alternatives, modifications, and variations as fall within the spirit and broad scope of the appended claims.

What is claimed is:

1. A method for preparing a titanium or titanium alloy surface comprising the steps of:

grit blasting desired portions of said surface; and applying an acid wash primer comprising an alcohol-zinc-chromate-phosphoric acid mixture to said desired portions, said grit blasting and primer applying steps improving the bondability of said titanium or titanium alloy surface, said primer consisting essentially of 90% by weight alcohol solution, 5% by weight zinc chromate and 5% by weight phosphoric acid.

2. The method of claim 1 further comprising the steps of:

allowing said primer to dry for a period of time after applying said primer to said desired portions; and applying an adhesive to said desired portions of said surface after said period of time.

3. The method of claim 1 wherein said applying step comprises applying a primer consisting essentially of 5% by weight zinc chromate, 5% by weight phosphoric acid, and 90% by weight of an alcohol solution consisting of about 65% to 80% by weight isopropyl alcohol, about 5% to 10% by weight ethyl alcohol and about 15% to 25% by weight n-butyl alcohol.

4. The method of claim 1 wherein said applying step comprises applying a primer consisting essentially of 70% by weight isopropyl alcohol, 5% by weight ethyl alcohol, 15% by weight n-butyl alcohol, 5% by weight zinc chromate and 5% by weight phosphoric acid.

5. The method of claim 1 wherein said grit blasting step comprises grit blasting said desired portions of said surface in one pass only using in the range of 60 to 80 grit garnet.

6. The method of claim 1 wherein said grit blasting step comprises grit blasting said desired portions of said surface in one pass only using in the range of 60 to 80 grit aluminum oxide.

7. The method of claim 1 wherein said applying step comprises applying a coat of said primer at room temperature using a spray gun.

8. The method of claim 1 further comprising the steps of:

masking portions of said surface to which an adhesive will not be applied prior to said grit blasting step; and degreasing unmasked portions of said surface with isopropyl alcohol after said masking step and before said grit blasting step.

9. The method of claim 8 wherein said degreasing step comprises wiping said isopropyl alcohol in at least one pass using a clean wipe for each at least one pass.

10. The method of claim 8 wherein said grit blasting step comprises vacuuming and blowing out said portions of said surface being grit blasted.

11. The method of claim 10 further comprising the steps of:

cleaning using isopropyl alcohol said portions of surface which have been grit blasted; and wiping said portions clean with a low lint cleaning cloth prior to said applying step.

12. The method of claim 11 further comprising using an inert gas to remove any lint particles from said surface after said wiping step and before said applying step.

13. The method of claim 12 wherein said primer is applied after said lint removal and within twenty minutes of said surface cleaning using isopropyl alcohol step.

14. The method of claim 2 wherein:

said primer is allowed to dry for at least sixty minutes; and said adhesive is applied within 24 hours of said primer application.

* * * * *